H. C. LOWRIE, DEC'D.

J. M. LOWRIE, ADMINISTRATOR.

WALL SAFE.

APPLICATION FILED AUG. 26, 1910.

Reissued Oct. 7, 1913. 13,625.

Attest:
Paul Finckel
Wm. E. Sawyer

Inventor:
Harvey C. Lowrie,
By Howard Taylor
Attorney

COLUMBIA PLANOGRAPH CO., WASHINGTON, D. C.

UNITED STATES PATENT OFFICE.

HARVEY C. LOWRIE, OF NEW YORK, N. Y.; JOHN M. LOWRIE, OF NEW YORK, N. Y., ADMINISTRATOR OF SAID HARVEY C. LOWRIE, DECEASED.

WALL-SAFE.

13,625. Specification of Reissued Letters Patent. Reissued Oct. 7, 1913.

Original No. 915,979, dated March 23, 1909, Serial No. 464,086. Application for reissue filed August 26, 1910. Serial No. 579,191.

*To all whom it may concern:*

Be it known that I, HARVEY C. LOWRIE, a citizen of the United States, residing at New York, in the county of New York and State of New York, have invented new and useful Improvements in Wall-Safes, of which the following is a specification.

My invention relates to wall safes or receptacles, and is an improvement upon the construction illustrated and described in United States Letters Patent No. 873,878, granted to me December 17, 1907. Said patent shows and describes a wall safe having a removable door-casing which is so mounted in the safe opening as to be adjustable with reference to the wall of the safe, an annular flange around the outer edge of the casing serving as a trim for covering the joint between the wall plastering and said casing. The construction is such that the door-casing may be secured to the safe after the latter has been built into a wall and said wall has received its finishing coat of plaster, so that the trim may be properly adjusted to the finished surface of the wall instead of the necessity of carefully finishing the wall around the safe opening, as would be required if the trim were made integral with the safe.

My present invention consists in making the trim separate from the door casing and independently adjustable. By this means I not only cheapen the cost of the door-casing, but make it possible to supply any one of a number of differently finished trims that may suit particular fancy; and the trim may be removed without disturbing the door casing, thus rendering it unnecessary to remove said casing when it is desired to recoat the wall with paper or other finishing material.

After a detail description of my invention, the features deemed novel will be specified in the claims hereunto annexed.

Figure 1:
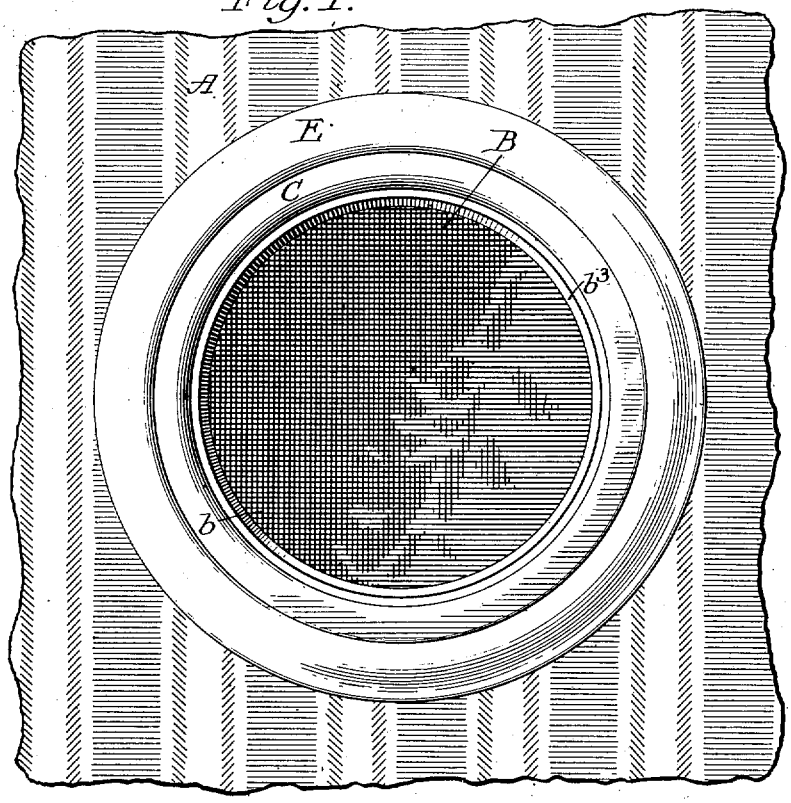
Figure 2:
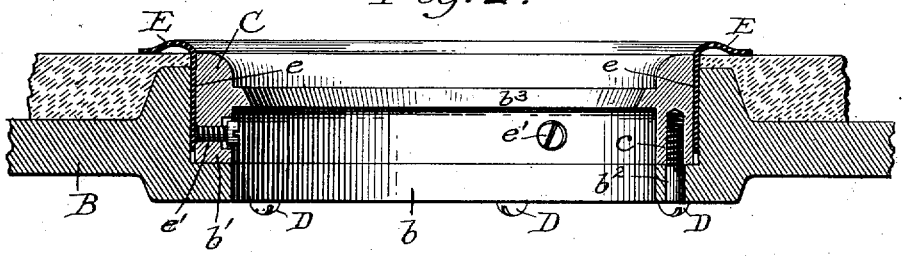

Referring to the drawings furnished and forming a part of this specification, Figure 1 illustrates a safe embodying my invention as it will appear when embedded in a wall, the door of the safe being removed, and Fig. 2 is a horizontal section through a portion of the front wall of the safe, showing the manner in which the door-casing and trim are secured thereto.

A represents the interior surface of a finished wall in which is embedded a wall safe B, the latter being provided with an opening $b$, which also extends through the plastering or interior finish of the wall, said opening being normally closed by a door, not shown. The safe may be made of cast or sheet metal, and may be made any desired size or shape. The wall surrounding the opening $b$ is stepped as at $b'$ to form a seat for the removable door-casing C. Around the opening $b$ and within that portion of the surrounding wall which constitutes the step or seat $b'$ is a series of bolt-holes $b^2$. The door-casing C is made to fit the seat $b'$ and is provided with threaded holes $c$ corresponding in number and location to the holes $b^2$ in the seat $b'$, the door-casing being secured to the safe by means of bolts D which pass through the holes $b^2$ into the threaded holes in the casing, as clearly shown in Fig. 2.

In order to cover the edge of the opening through the finished surface of the wall I provide a finish-rim or a trim E which is adjustable toward and from the safe, so that it may be properly adjusted to the surface of the wall and thus afford a neat finish to the safe opening. It is to be understood that the safe opening may be made any desired shape, but as illustrated said opening is circular, and the trim E is therefore in the form of a ring. Whatever the shape of the door opening, the trim should be of a width sufficient to extend well over the edge of the surrounding plaster or other wall finish to cover any irregularities therein that cannot well be avoided in finishing the wall close to the opening. Said trim is provided with a rearwardly projecting flange $e$ which closely fits the safe opening, said flange telescoping in said opening to permit of adjustment. The door-casing is made to fit within the flange $e$, so that the latter is slidably mounted between the outer edge of the door-casing and the wall of the safe opening. The trim is held in place by means of two or more screws $e'$ which pass through the door-casing and impinge against said flange for clamping it against the wall of the safe opening.

It will be readily seen that the trim E may be adjusted to suit requirements, and that it may be removed from the safe without the necessity of removing the door-casing, this being desirable, for instance, when a wall is to be re-papered.

It will be noted that the door-casing is provided with an annular flange $b^3$ around its interior surface. This flange affords a shoulder with which the locking bolts of the door engage for locking the door to the casing. The door forms no part of my present invention and is not therefore shown in the drawings.

What I claim as new and desire to secure by Letters Patent is:

1. The combination with a wall safe adapted to be embedded in a wall, said safe having an opening, of a door frame attachable to the safe after the safe is embedded in a wall, and a finish rim engaging said frame and independently adjustable toward and from the safe.

2. The combination with a wall safe or receptacle having an opening formed therein, of a door-casing removably secured thereto, and a trim surrounding said casing, said trim being adjustable toward and from the safe independently of said door-casing.

3. The combination with a wall safe or receptacle having an opening formed therein, a door-casing removably mounted in said opening, and a trim adjustably mounted between said casing and the wall of said opening.

4. The combination with a wall safe or receptacle having an opening formed therein, a door-casing removably mounted in said opening, a trim adjustably mounted between said casing and the wall of said opening, and means for locking said trim in its adjusted position.

5. The combination with a wall safe or receptacle having an opening formed therein, of a trim having a rearwardly projecting flange telescoping in said opening and a door-casing mounted within said flange and removably secured to said safe.

6. The combination with a wall safe or receptacle having an opening formed therein, of a trim having a rearwardly projecting flange telescoping in said opening, a door-casing mounted within said flange and removably secured to said safe, and means carried by said casing for clamping said flange against the wall of said opening.

In testimony whereof I have hereunto set my hand in presence of two subscribing witnesses.

HARVEY C. LOWRIE.

Witnesses:
A. H. Lewis,
J. A. Horstmann.

Copies of this patent may be obtained for five cents each, by addressing the "Commissioner of Patents, Washington, D. C."